(No Model.) 8 Sheets—Sheet 1.
H. A. BRISSARD.
PAPER RULING MACHINE.
No. 402,057. Patented Apr. 23, 1889.
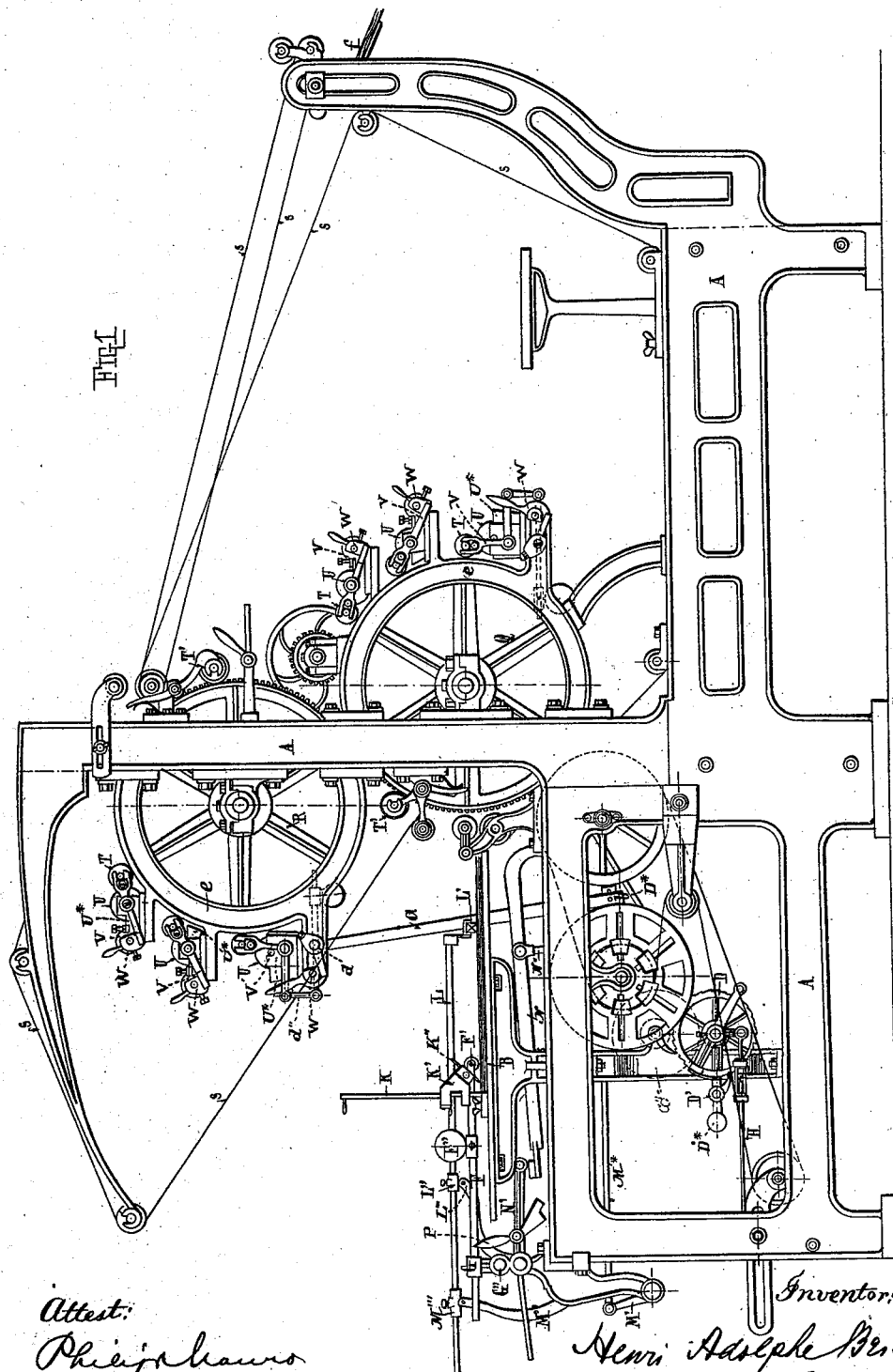

(No Model.)
8 Sheets—Sheet 2.
H. A. BRISSARD.
PAPER RULING MACHINE.
No. 402,057. Patented Apr. 23, 1889.
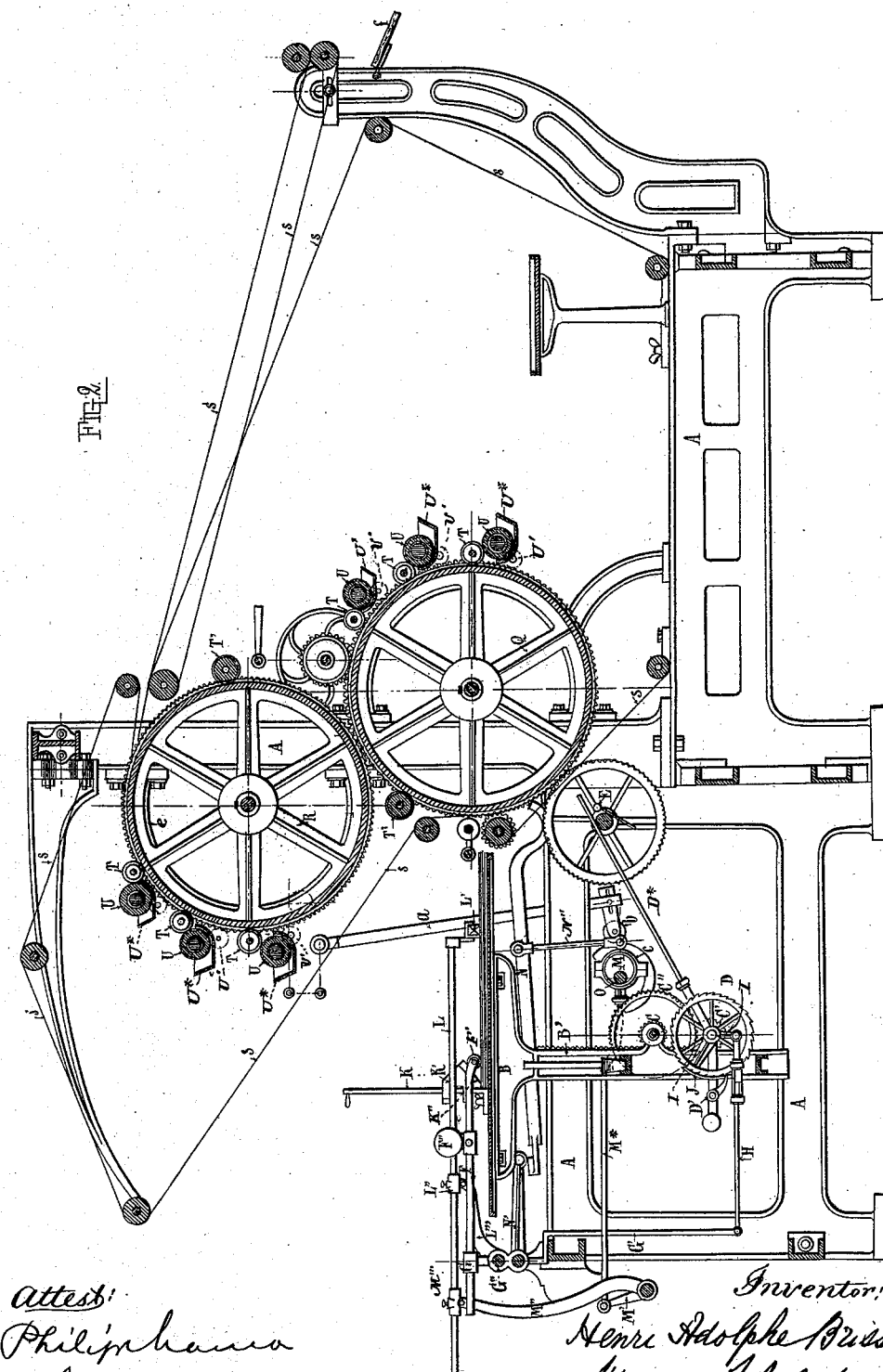

(No Model.)
8 Sheets—Sheet 3.
H. A. BRISSARD.
PAPER RULING MACHINE.
No. 402,057. Patented Apr. 23, 1889.
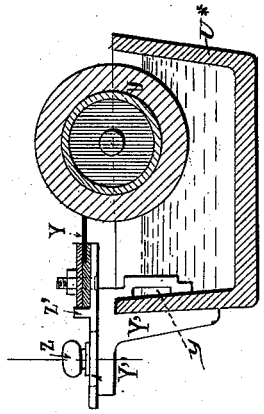
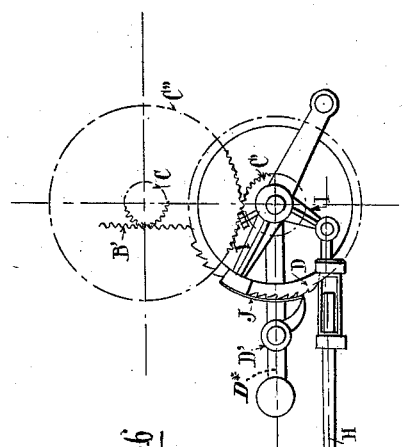
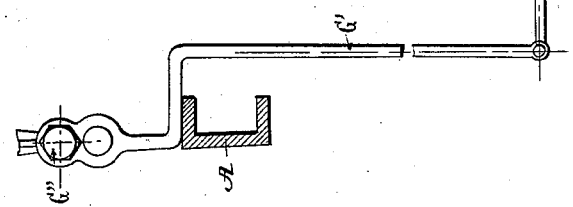
Attest:
Philip Mauro
C. J. Hedrick
Inventor:
Henri Adolphe Brissard
by A. Pollok
his attorney.

(No Model.)
H. A. BRISSARD.
PAPER RULING MACHINE.
No. 402,057. Patented Apr. 23, 1889.
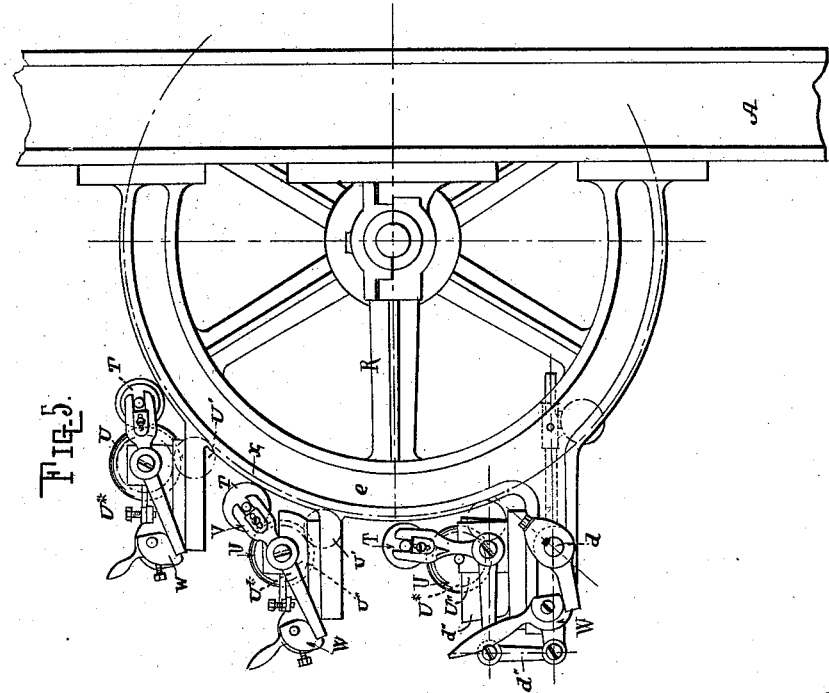
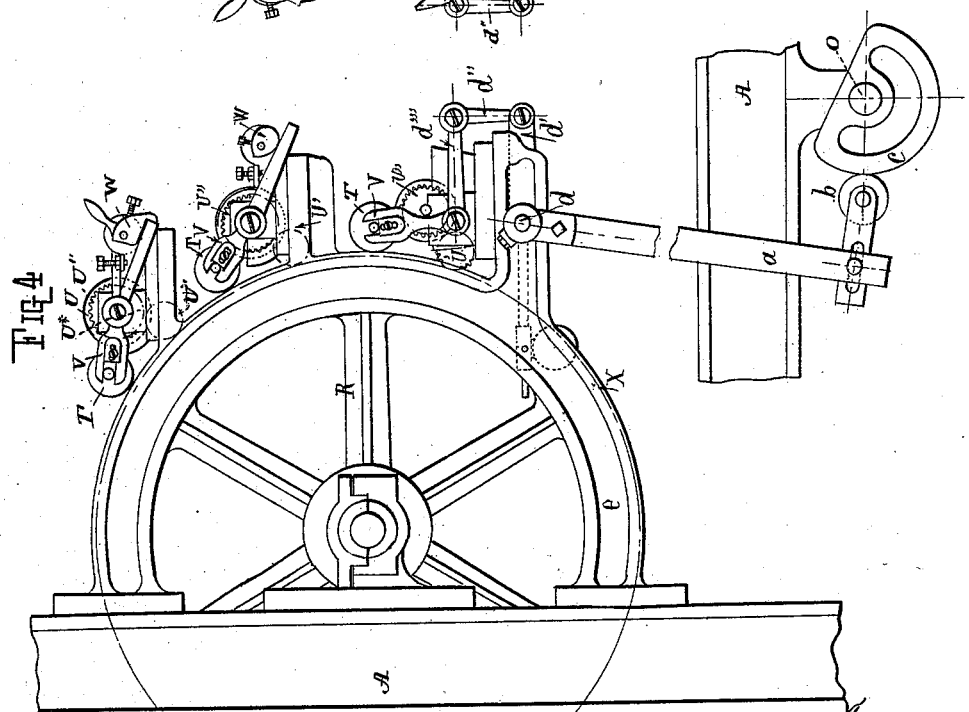
Attest:
Philip Mauro
C. J. Hedrick
Inventor:
Henri Adolphe Brissard
by A. Pollok
his attorney.

(No Model.) 8 Sheets—Sheet 5.
H. A. BRISSARD.
PAPER RULING MACHINE.
No. 402,057. Patented Apr. 23, 1889.
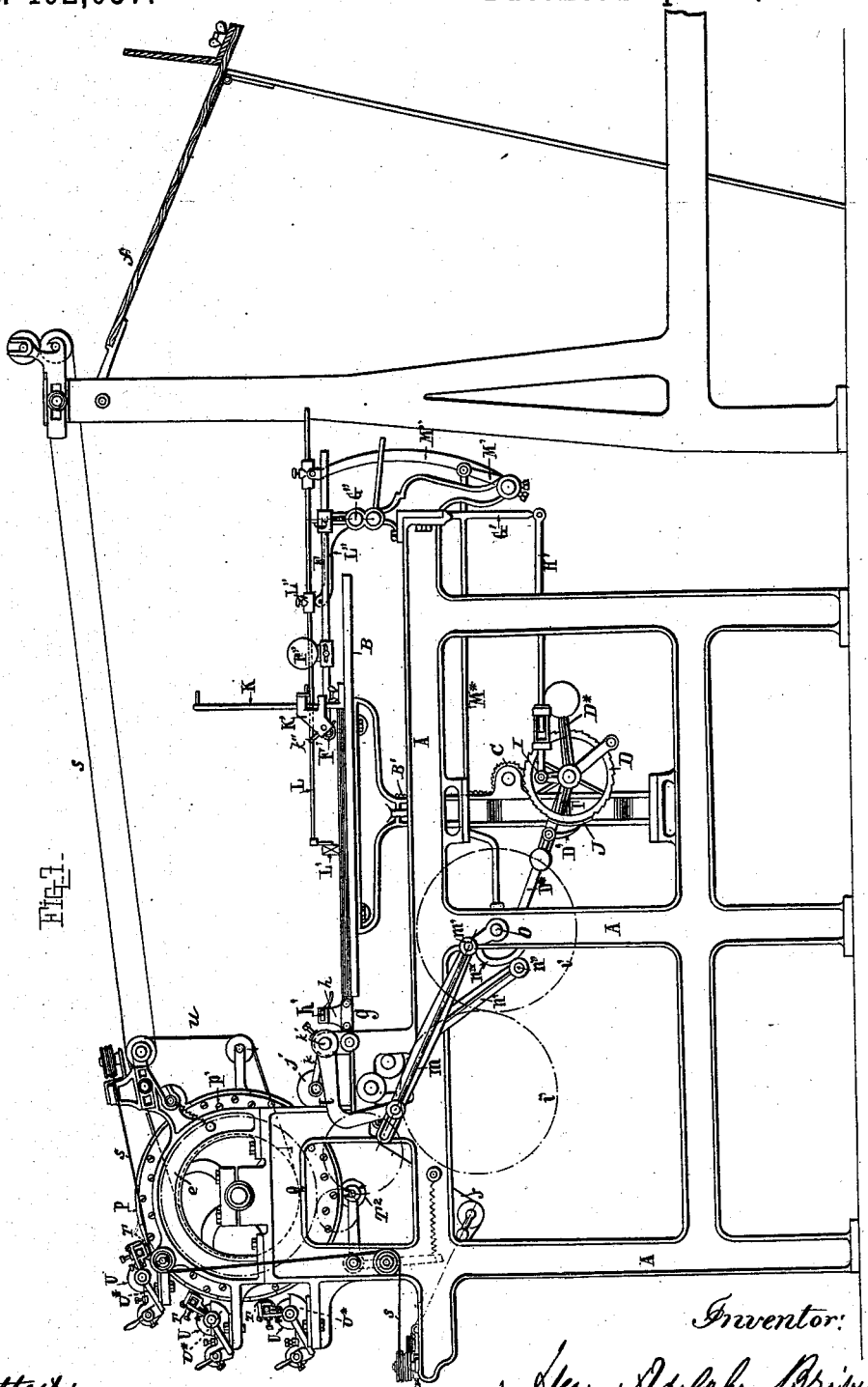

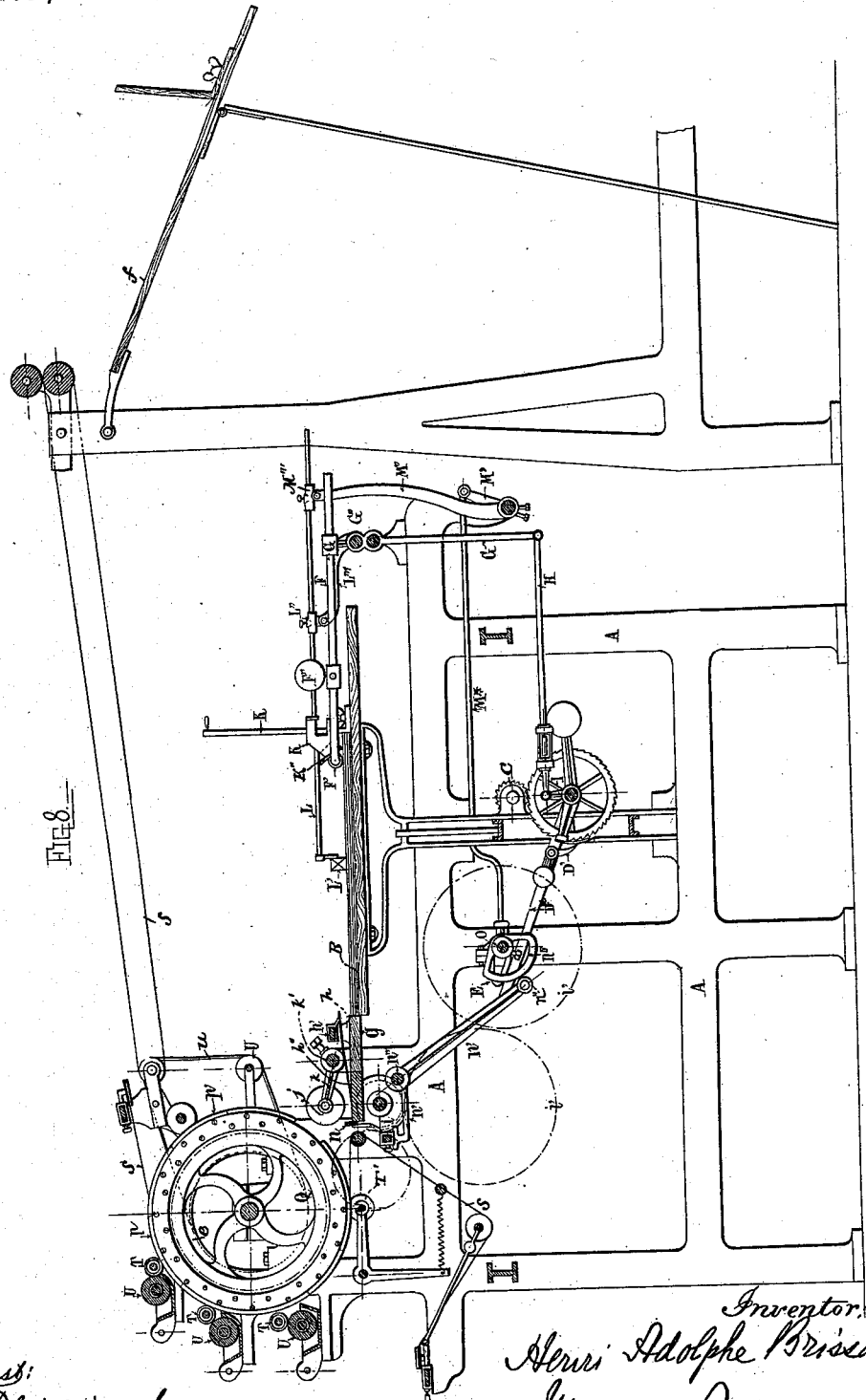

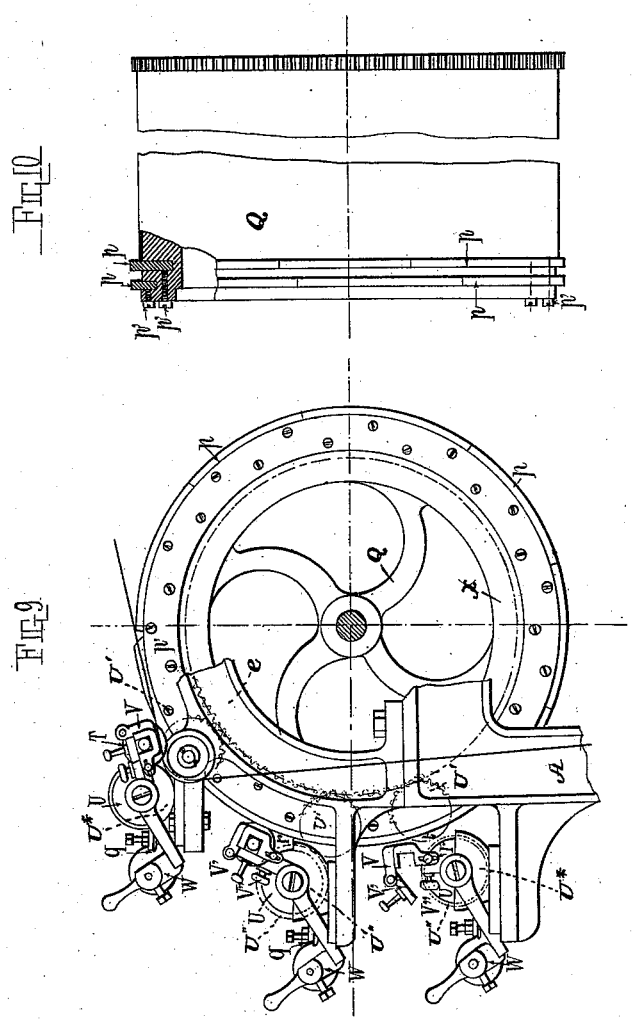

(No Model.) 8 Sheets—Sheet 8.
H. A. BRISSARD.
PAPER RULING MACHINE.
No. 402,057. Patented Apr. 23, 1889.
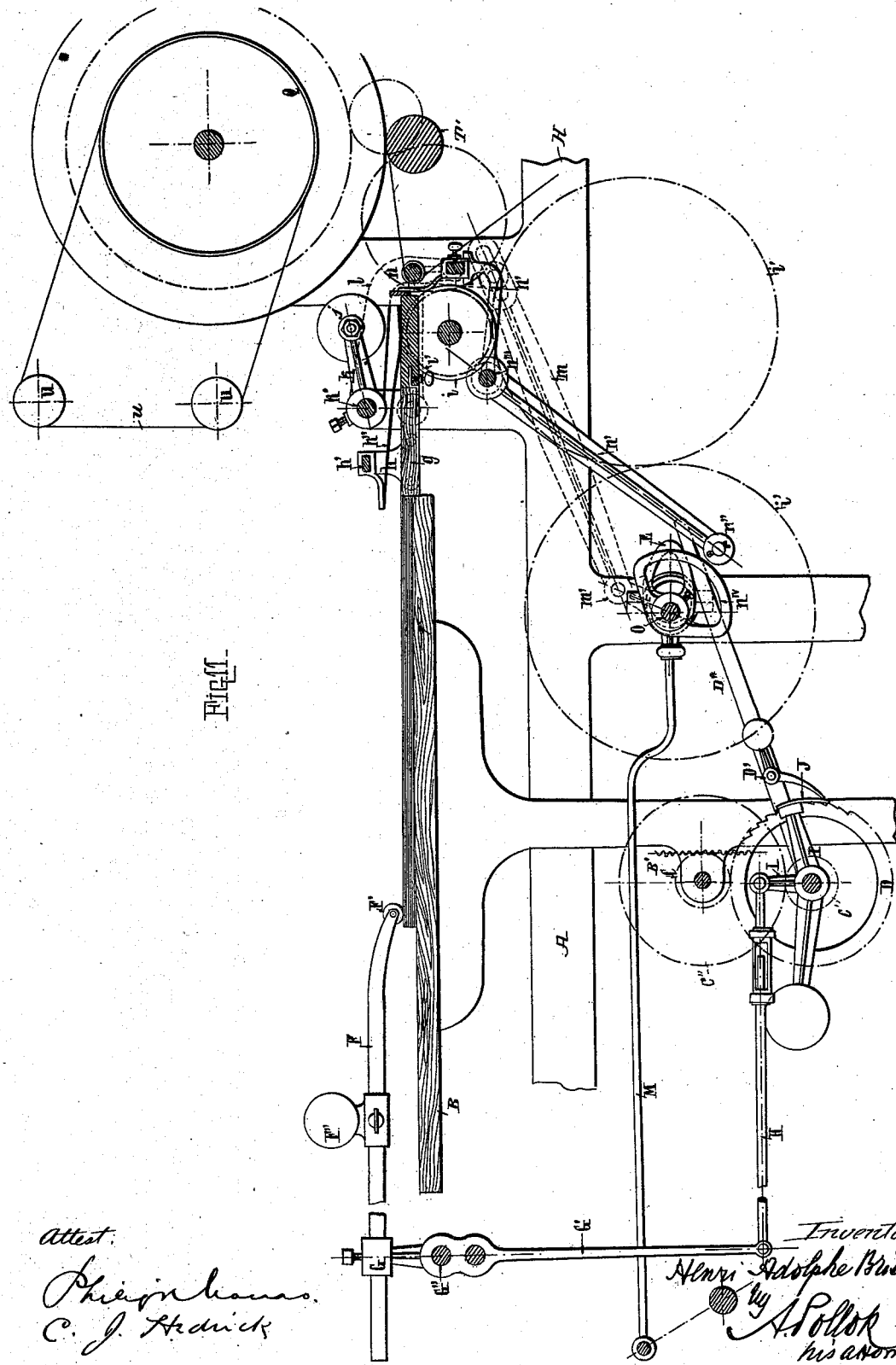
Fig. II.
Attest:
Inventor.
Henri Adolphe Brissard
by A. Pollok
his attorney
N. PETERS, Photo-Lithographer, Washington, D. C.

UNITED STATES PATENT OFFICE.

HENRI ADOLPHE BRISSARD, OF PARIS, FRANCE.

PAPER-RULING MACHINE.

SPECIFICATION forming part of Letters Patent No. 402,057, dated April 23, 1889.

Application filed October 11, 1888. Serial No. 287,872. (No model.)

*To all whom it may concern:*

Be it known that I, HENRI ADOLPHE BRISSARD, a citizen of the Republic of France, and a resident of Paris, in the said Republic, have invented certain new and useful Improvements in Paper-Ruling Machines, of which the following specification is a full, clear, and exact description.

This invention relates to machinery for ruling paper.

In order that the nature and operation of the different improvements may be fully understood the general operation will be briefly described, and the special points of novelty more completely developed.

Figure 1 is a side elevation of a machine for ruling paper on both sides at one passage through the machine, constructed in accordance with the invention. Fig. 2 is a longitudinal vertical section of the machine. Fig. 3 is a detail view, on a larger scale, of a new inking apparatus. Figs. 4 and 5 are detail views, on a similar scale, of the ruling mechanism proper. Fig. 6 is a detail view of machinery for keeping the top of the pile of paper to be fed at the same level. Fig. 7 is an elevation of a ruling-machine containing some additional improvements, which also form part of the invention. Fig. 8 is a longitudinal vertical section of the same. Fig. 9 is a detail view of the ruling-machine proper. Fig. 10 is a view of the carrying-drum, which holds and advances the paper in ruling. Fig. 11 is a partial view, in sectional elevation, illustrating on a larger scale than Figs. 7 and 8 the movable table, its automatic regulating mechanism, feeding devices, and other parts.

The machine is composed of principally, first, the movable table carrying the pile of paper to be ruled with the feeding mechanism for pushing the sheets, one at a time, toward the carrying-drum, and the mechanism for automatically regulating the level of the table, which should rise progressively as the thickness of the pile of paper diminishes, this last mechanism being of the greatest importance for a good operation of the pusher; second, the carrying-drum for holding and advancing the paper, and the ruling mechanism proper, with its inking apparatus and means for disconnecting and raising the tracing or ruling rollers for putting them out of action; third, a table for receiving the ruled paper. All the parts are supported by the frame A. The movable table B, which receives the pile of paper to be ruled, is carried by two toothed supports, B', sliding vertically in guides and meshing with pinions C, which are rotated by an eccentric pin or cam, E, (see Figs. 2, 8, and 11,) through a lever, D*, carrying a pawl, D', a ratchet-wheel, D, engaged by said pawl D', a pinion, C', fixed on the shaft of ratchet D, and a spur-wheel, C'', fixed on the shaft of pinions C. At each rotation of the pin or cam E the pawl D' is advanced, and the table B would be lifted slightly through the ratchet D and gearing C' C'' C B' unless a break in the chain of communication were effected.

In order to keep the top of the pile of paper at or about the same levels, a disconnecting mechanism is provided, which is operated by a presser bearing upon the paper, so that when the presser is below the normal the communication is established; but so soon as the presser is forced slightly above the normal it operates the disconnecting mechanism and stops the rise of the table.

The presser F, in the form of a bar carrying a roller, F', at its outer end and held down by a weight, F'', is held in the socket G of a lever, G', pivoted at G'', and the disconnecting mechanism is formed by a thin curved plate, J, mounted on an elbow-lever I, which turns loose on the shaft of the ratchet D, and has its other arm connected by the jointed rod H (whose length is adjustable by ordinary means) with the lower end of the lever G', the plate J being so arranged that when the presser F rises sufficiently the plate J is interposed between the pawl D' and the ratchet D, and causes the pawl to move idly on its surface, thus preventing the pawl from conveying motion to the ratchet and through it to the table B. When, through the removal of the successive sheets from under the presser F F', the latter descends sufficiently, it withdraws the plate J and allows the pawl D' again to act and raise the table until the presser reaches its former level, when the plate J is again interposed and the upward motion of the table is arrested. The weight F'' is made adjustable on the arm, so that the pressure on the paper can be varied. For pushing the sheets of paper forward one at a time, retaining-points K″ are used in connection with a pusher, L L′. The points K″ are set in carriers K′, which slide vertically on the upright bars K, whose feet, set in grooves in the table B, are held secured by set-screws. The points bear on the borders of the paper and allow the leaves to escape only one by one.

The pusher is composed of a bar, L, provided with arms carrying rubber (caoutchouc) pushing-blocks L′. This bar L is guided by the socket L″ of lever-arm L‴, which raises and lowers the inner end of said bar. It (the bar L) is fixed in the socket M‴ of the lever-arm M″, which imparts thereto a back-and-forth movement. The lever-arm M″ is worked by means of the eccentric M, Fig. 2, on the shaft O, through the eccentric-rod M* and arm M′, and when it moves forward the blocks L′ push along the top sheet of the pile. During the return of the blocks L′, in order that they may not act on the paper, they are lifted therefrom by the action of a second eccentric on shaft O, through the rod N″, the lever N, and lever-arms N′ and L‴, the latter being arms of a common rock-shaft and the end of lever N including the end of arm N′. When it is desired to put the pusher out of action entirely, the hand-cam P, Fig. 1, is turned so as to hold up the arms N′ L‴ and keep the pushing-blocks L′ from contact with the paper.

The paper during the tracing or ruling operation is held on the carrying-drums Q R, Figs. 1 and 2, which are combined with a system of endless tapes or threads, S, for holding and guiding the sheets, so that they pass first partially around the drum Q, then partially around the drum R, and then are delivered to the shelf F. During the passage around the drum Q each sheet is ruled on one side by the tracing disks or rollers T on the right of said drum, as shown in Figs. 1 and 2, and during its passage around the drum R it is ruled on the opposite side by the tracing disks or rollers T, at the left of said drum in Figs. 1 and 2. The tracing-rollers T bear upon inking-rollers U, which turn in ink-wells U*, mounted on brackets of the arc e, which is bolted to the frame A. The rollers T are journaled in the forked ends of levers V, which turn about the axes of the inking-rollers U, and whose opposite ends are acted upon by the hand-cams W, so as to withdraw the said rollers and interrupt the tracing or ruling operation when the cams are properly turned. Spring-held rollers T′, for absorbing any ink which may get on the drums, complete the system.

The general construction and arrangement are the same as customary in my machines; but I have nevertheless made some modifications, as follows: The inking-rollers U are actuated by gearing, Fig. 4, from the drums Q R, a spur-wheel, X, on each drum imparting motion through an idler, U′, to the pinions U″ on the arbors of the inking-rollers. The inking apparatus also presents a new disposition for spreading properly the ink on the inking-roller U, Fig. 3. The scraper Y, bearing at one side against the periphery of the inking-roller U, is carried by a support, Y′, which embraces the edges of the ink-well, and which has the inside arm hollowed out, as shown at y, to prevent the ascent of the ink by capillarity. The scraper Y, of flannel, felt, or other suitable material, is clamped between plates, and is fastened to the slide Z′, which is adjustable in ways Y″ of the support Y′, and is clamped by the set-screw Z. It is thus easy to vary the pressure of the scraper y against the inking-roller U, so as to regulate the quantity of ink which is carried over by the inking-roller.

In order that the lowest tracing-roller, T, of the upper drum, R, may be of the same length as the others and that each roller may be indifferently placed in the position of any other, I have combined with said lowest roller a mechanism, whereby it may be automatically lifted in order to make interruptions. This is effected by the cam c on the arbor O, which acts through the roller b on the lever-arm a, (outside the frame A,) and turns the rock-shaft d (to which the upper end of the lever-arm a is secured) and lever-arm d′, (also secured to said rock-shaft,) so as to draw down the link d″ and arm d‴ and move the lever V and roller T away from the drum R and produce an interruption. So soon as the cam c releases the lever a the latter's own or other weight or a spring again presses the tracing-roller T against the drum.

In the machine shown in Figs. 1 to 6 there are two drums, in order to rule both sides of the sheet at one passage. If it is desired to rule on one side only, the ruling mechanism of the second drum may be put out of action. I may also provide machines with a single drum only when the work for which they are designed is to be ruled on one side only.

Record-paper is ordinarily ruled on both sides in two directions perpendicular to each other. To obtain this ruling with the machine which has been described, two successive passages are necessary—one to trace or rule the lines to guide in writing, and the other the lines (single or double) which divide the pages into columns. By combining with each other two like machines I can produce directly at a single passage the two rulings perpendicular to each other on both sides of the sheet. For this purpose, if the machines are placed end to end, I arrange horizontally the table f, which receives the paper ruled by the first machine, and I place in perforations of this table two rollers, one small and conical, the other frusto-conical, but of the same angle at the apex, with the upper surfaces of both rollers flush with the top of the table. These rollers are turned at the same angular velocity. Above these feeding-rollers I place a corresponding pair of pressure-rollers, which by means of suitable mechanism can be raised or lowered tangentially to those set in the table. As each sheet arrives on the table $f$ it is caught between the conical rollers and receives a movement of rotation in the plane of the table of a quarter of a circle. The rotation being finished, pushing-organs, like those hereinbefore described, seize the sheet and push it into the next machine, which rules it perpendicularly to the ruling of the first machine.

If, instead of placing the two machines end to end, they are arranged at right angles to each other with the delivery end of one and the feeding end of the other at adjacent sides of the table $f$, placed horizontally, the conical rollers for giving a quarter-turn to the leaves are no longer necessary, since, as delivered from the first machine, the sheets are in correct position relative to the second machine to be ruled thereby at right angles to the former ruling.

In the machine shown in Figs. 1 and 2 the pusher L L' feeds the sheets directly to the ruling machinery proper. In the machine shown in Figs. 7 to 10 supplementary devices are used in connection with the pusher mechanism for assuring the feed of the sheets in right lines and a correct position relative to the line of feed.

At the delivery end of the movable table B is a fixed shelf, $g$, whose anterior portion is of wood and the rest of metal, and which is set at such height that its upper surface corresponds with that of the pile of paper on the table B. Supports $h$ at the sides of the shelf support a cross-bar, $h'$, to which are fastened a row of springs, $h''$, suitably spaced, whose ends in operation hold down the sheets on the shelf $g$. A feed-roller, $i$, is set in the shelf $g$ with the top of its periphery flush with the shelf $g$, and is turned by means of the train of gears $i'$. Above the roller $i$, opposite the spaces between the springs $h''$, are a series of pressure-disks, $j$, which can be raised or lowered to clear or to clamp the paper on the feed-roller $i$, the springs $h''$ preventing the paper from being lifted with the disks $j$. The disks $j$ are loose on an axle at the outer ends of lever-arms $k$ whose inner ends are fixed to a rock-shaft, $k'$, provided at one end with a bent arm, $c$, terminating in a button which can slide in the slot or groove of a pitman, $m$, reciprocated by the crank $m'$. This crank is keyed on the main shaft of the machine, so that the disks $j$ descend against the roller $i$ at the moment when a sheet of paper is brought over this roller by the pusher L L'.

To bring the sheet into the precise position desired in ruling, I employ the following means: A stop-bar, $n$, at the posterior end of the shelf $g$, is combined with operating mechanism, consisting of a bent lever, $n'$, carrying the bar $n$ on one arm, fulcrumed at $n'''$, and provided with a friction-roller, $n''$, on the opposite arm, and a cam, $n^{IV}$, so set on the shaft O that the bar $n$ is raised above the shelf $g$, as shown, at the proper time to form a stop to straighten the paper, and when removed to allow the paper to be fed to the ruling mechanism. In operation the pusher L L', when it advances a sheet, does not push it quite to the straightening-stop $n$; but after its return, when it pushes forward the next underlying sheet, the latter carries the top sheet forward with itself until the edge of said top sheet strikes the stop and is straightened, if by any means it is not in correct position. The stop $n$ is then lowered at once, the pressure-disks $j$ are forced down to press the sheets on the feed-roller $i$, which thereupon feeds it to the drum Q. The second sheet, which in its turn has been only partially pushed forward by the direct action of the pusher L L', is in like manner fed against the stop $n$ by the pusher L L', through an underlying sheet on which the pusher acts directly, and after being straightened by said stop is fed to the ruling-machinery by the roller $i$, and so the operation proceeds, each sheet being fed against the stop while lying free on the sheet below, which acts as a carriage. The sheets are held against the drum Q by the tapes or threads $s$, suitably arranged to give access at the front of the machine. Tracing and inking rollers produce the ruling of the paper. Cams W act on the tails of the levers V, which carry the tracing-rollers, to lift them away from the paper, if it is desired to arrest their action. The different rollers are operated by a gear-wheel, $x$, Fig. 9, on the drum Q, through idlers U'.

To make interruptions in the tracing or ruling operations, I have invented special means for lifting the tracing-rollers automatically. The means, as shown in detail in Figs. 9 and 10, consist of a cam in which the tracing-rollers rest, and which is formed by segmental pieces $p$, set in grooves in the periphery of the drum. A double set of these pieces, arranged to break joints, is provided so that in passing a joint in one set, the roller is supported by the middle of a piece of the other set, and the pieces of the inner set are of greater depth and are set in a groove of greater depth, so that both sets may be held independently of each other by their appropriate set-screws $p'$, as shown in Fig. 10. Springs $q$ hold the rollers T against the cams $p$, and when a gap presents itself forces the rollers against the paper on the drum Q, so that they may trace the lines thereon; but at other times the cams $p$ hold the rollers away from the paper and the ruling is interrupted. By arranging the pieces $p$ so as to leave gaps at suitable intervals, the ruling can be made in any desired part of the paper. At the moment when the rollers mount or descend from the cams $p$ a little shock may be made, which might have the effect of throwing the journals of the rollers T out of their forks if these were left open, as in Figs. 1, 4, and 5. To avoid such accidents, the mouths of the forks are closed by hinged covers V', which are held down by turn-buttons V'', having the base inclined, so as to hold the covers firmly in place. To remove the rollers from their supports the covers V' can be turned out of the way.

In order that the length of the lever-arms V, which carry the rollers T, can be varied, the forked ends are adjustably connected with the bodies of the levers by slots $r$ and set-screws $t$, so as to be adjustable. Blotting-rollers T', held by springs against the drum Q, serve to absorb any ink which may get on the drum. A belt, $u$, transmits motion to the tapes $s$ from the drum Q.

I would also indicate that the arrangement of the machine-frame in Figs. 7 and 8 permits a second drum to be placed in the same horizontal plane as the first when it is desired to rule both sides of the sheet at one passage, and that in this position the organs are somewhat more accessible than when the two drums are placed one above the other, as in Figs. 1 and 2, and their supervision is consequently easier.

I claim as my invention or discovery—

1. The combination, with the vertically-movable table for supporting the pile of paper to be ruled, and the feeding mechanism or pusher, of means whereby the level of the top of the pile is kept constant, said means consisting of a system of gearing which operates to raise the table progressively, a presser which rests on the pile of paper, and a disconnecting mechanism controlled by said presser and operating to arrest the upward motion of the table when said presser is lifted above the normal, substantially as described.

2. The combination, with the vertically-movable table, of the toothed supports of the table, the gears, the ratchet, the pawl, and the eccentric pin or cam for raising the table, the movable plate or guard adapted to be interposed between the pawl and ratchet to prevent the operation of the latter by the former, the presser which rests on the pile of paper on the said table, and the lever and jointed rod connecting the said presser with the said guard, substantially as described.

3. The combination, with the carrying-drum, the series of tracing and inking rollers, and the lever-supports for the rollers, of the means for interrupting the operation of the lower roller of the upper drum, said means comprising a cam on a shaft of the machine, a lever-arm operated by said cam, a rock-shaft to which the arm is fixed, and additional lever-arms connected by links with the lever-supports of said tracing-rollers, substantially as described.

4. The combination, with an ink-roller and ink-well, of an adjustable scraper, of felt or like material, and a support for said scraper embracing the edge of the said well, and having the inside arm hollowed out next the wall of the well to prevent the ink from mounting by capillarity, substantially as described.

5. The combination, with a supporting-table and pusher, of a mechanically-operated straightening-stop arranged in front of a pile of paper on the table at a distance in excess of the stroke of the pusher, so that each sheet is fed against the stop to straighten the same by the pusher acting upon an underlying sheet, substantially as described.

6. The combination, with the ruling machinery proper, of the supporting-table, pusher, mechanically-operated straightening-stop, and feed-rollers or disks, substantially as described.

7. The combination, with the ruling machinery proper, of the supporting-table, pusher, mechanically-operating straightening-stop, feed-roller, series of springs, and vertically-movable pressure-disks set opposite the spaces between the springs, substantially as described.

8. A carrying-drum provided with a cam and holding-tapes, in combination with tracing-rollers rolling on said cam, and the means for inking said tracing-rollers, substantially as described.

9. A drum provided with a cam formed by two rows of segmented pieces set in grooves in the periphery of the drum, the inner set of pieces and the grooves therefor being deepest, and the two sets of pieces being held by independent set-screws tapped in from the end of the drum, in combination with tracing-rollers running on said cam, and means for inking said rollers, substantially as described.

10. In combination with the carrying-drum, the cam thereon, and the tracing-rollers rolling on said cam, the forked supports for the journals of the said tracing-rollers, provided with removable covers for confining the journals in the forks, substantially as described.

11. The ruling-machine comprising a machine-frame, a carrying drum or drums thereon, the tapes for said drums, the vertically-movable table, the gearing for lifting it, the guard or plate for interrupting the transmission of the movement to said table, the presser, the connections between the said presser and the said guide or plate, the pusher and its operating mechanism, the tracing-rollers, the inking-rollers, the ink-wells, and the gearing for rotating the inking-rollers in said wells, substantially as described.

In testimony whereof I have signed this specification in the presence of two subscribing witnesses.

HENRI ADOLPHE BRISSARD.

Witnesses:
PAUL GIRALZE,
R. J. PRESTON.